(12) United States Patent
Pfeilschifter et al.

(10) Patent No.: US 11,277,020 B2
(45) Date of Patent: *Mar. 15, 2022

(54) MOTOR VEHICLE HAVING AN AC CHARGING DEVICE WITH A PRECHARGE CIRCUIT FOR A SMOOTHING CAPACITOR

(71) Applicant: VITESCO TECHNOLOGIES GMBH, Hannover (DE)

(72) Inventors: Franz Pfeilschifter, Munich (DE); Martin Goetzenberger, Munich (DE); Klaus Muehlbauer, Munich (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/978,835

(22) PCT Filed: Feb. 26, 2019

(86) PCT No.: PCT/EP2019/054740
§ 371 (c)(1),
(2) Date: Sep. 8, 2020

(87) PCT Pub. No.: WO2019/170476
PCT Pub. Date: Sep. 12, 2019

(65) Prior Publication Data
US 2021/0155101 A1 May 27, 2021

(30) Foreign Application Priority Data

Mar. 8, 2018 (DE) .......................... 102018203486.9

(51) Int. Cl.
*H02J 7/00* (2006.01)
*H02J 7/02* (2016.01)
(Continued)

(52) U.S. Cl.
CPC .................................. *H02J 7/02* (2013.01); *B60L 3/04* (2013.01); *B60L 53/14* (2019.02); *B60L 53/55* (2019.02); *H02J 7/345* (2013.01); *H02J 2207/20* (2020.01)

(58) Field of Classification Search
CPC .......... H02J 7/02; H02J 7/345; H02J 2207/20; B60L 53/55; B60L 53/14; B60L 53/22;
(Continued)

(56) References Cited

U.S. PATENT DOCUMENTS 4,621,225 A * 11/1986 Birk ...................... H02J 7/0072
320/139
9,193,272 B2 11/2015 Fassnacht et al.
(Continued)

FOREIGN PATENT DOCUMENTS

DE  102009029091 A1  3/2011
DE  102010007452 A1  8/2011
(Continued)

*Primary Examiner* — Naum Levin
(74) *Attorney, Agent, or Firm* — Laurence A. Greenberg; Werner H. Stemer; Ralph E. Locher

(57) ABSTRACT

An AC charging device for a motor vehicle has a neutral conductor, at least one phase conductor, and at least one rectifier. The neutral conductor and the phase conductor are connected to the rectifier and the rectifier is furthermore electrically connected to at least one smoothing capacitor. The AC charging device includes a precharge circuit arranged between a mains connection of the AC charging device and the smoothing capacitor. The precharge circuit is designed to precharge the smoothing capacitor. The phase conductor, in a connection section, is connected to at least one further phase conductor of the AC charging device by way of a cross-connection line, which has a cross-connection switch for disconnecting the phase conductor and the further phase conductor. The precharge circuit is arranged (Continued)

between a mains connection of a first phase conductor of the phase conductors and the connection section.

10 Claims, 3 Drawing Sheets

(51) Int. Cl.
  *B60L 53/55* (2019.01)
  *B60L 53/14* (2019.01)
  *B60L 3/04* (2006.01)
  *H02J 7/34* (2006.01)
(58) Field of Classification Search
  CPC ............ B60L 2210/10; B60L 2210/30; B60L 2210/40; B60L 2270/20; Y02T 90/14; Y02T 10/7072; Y02T 10/72
  See application file for complete search history.

(56) References Cited

U.S. PATENT DOCUMENTS

| | | | |
|---|---|---|---|
| 9,227,517 B2* | 1/2016 | Griessbach | B60L 53/20 |
| 9,935,561 B2* | 4/2018 | Ide | H02M 1/10 |
| 10,270,360 B2* | 4/2019 | Tazaki | H02M 7/062 |
| 10,389,166 B1* | 8/2019 | Sahoo | H02J 7/02 |
| 2012/0306264 A1 | 12/2012 | Komma et al. | |
| 2019/0036462 A1 | 1/2019 | Tazaki et al. | |
| 2019/0077267 A1 | 3/2019 | Song | |
| 2020/0406768 A1* | 12/2020 | Pfeilschifter | H02J 7/02 |
| 2021/0008984 A1* | 1/2021 | Pfeilschifter | B60L 53/14 |

FOREIGN PATENT DOCUMENTS

| | | |
|---|---|---|
| DE | 102011016532 A1 | 6/2012 |
| JP | 2007282359 A | 10/2007 |
| JP | 2015033233 A | 2/2015 |
| KR | 20180000234 A | 1/2018 |
| WO | 2017159078 A1 | 9/2017 |

* cited by examiner

MOTOR VEHICLE HAVING AN AC CHARGING DEVICE WITH A PRECHARGE CIRCUIT FOR A SMOOTHING CAPACITOR

BACKGROUND OF THE INVENTION

Field of the Invention

The invention relates to an AC charging device for a motor vehicle, wherein the AC charging device has a precharge circuit for a smoothing capacitor, and to a vehicle having such an AC charging device.

AC charging devices are known. An AC charging device may be used to supply energy to an on-board power system of a motor vehicle, or else to charge a traction battery of the motor vehicle. The AC charging device is designed to receive AC current from a mains and to output DC current to an on-board power system of a motor vehicle.

The AC charging device usually has at least one smoothing capacitor. The smoothing capacitor reduces any residual ripple or an AC current component that remains after the AC current has been rectified. The smoothing capacitor absorbs (or short-circuits) AC voltage components that arise due to the pulsed DC voltage. The smoothing capacitor is usually precharged by a precharge circuit before a mains disconnection contactor, which establishes a connection between a mains and the smoothing capacitor, is closed. The precharge circuit in this case usually has only one precharge resistor, which limits the charging current before the actual charging process for the on-board power system of the vehicle begins by closing the mains disconnection contactor. As a result of the precharging, the smoothing capacitor is brought to the voltage level of the mains with a delay. The precharge circuit thus avoids an abrupt breakdown of the voltage of the mains on the smoothing capacitor, in particular as a result of the current limitation by the precharge resistor.

One disadvantage of the known precharge circuit is that a respective precharge circuit is provided for all of the phases of the AC charging device.

SUMMARY OF THE INVENTION

One object of the present invention is to provide an AC charging device, a motor vehicle and a method by way of which or with which or in the case of which an AC charging device is able to be designed more simply.

This object is achieved by way of an AC charging device, a motor vehicle and a method as claimed in the independent claims.

An AC charging device according to the invention for a motor vehicle has a neutral conductor, at least one phase conductor, in particular three phase conductors, and at least one in particular passive rectifier. The neutral conductor and the phase conductor are connected to the rectifier, in particular to an AC voltage side of the rectifier. A smoothing capacitor is connected in parallel with the DC voltage side of the rectifier. The AC charging device furthermore has a precharge circuit arranged between a mains connection of the AC charging device and the smoothing capacitor, which is preferably the first smoothing capacitor viewed from the mains connection of the phase conductor. The precharge circuit is designed to precharge the smoothing capacitor. The precharge circuit is connected to the DC voltage side of the rectifier. The precharge circuit is connected downstream of the mains connection. The precharge circuit is connected between the mains connection and the rectifier and preferably connects these components. The rectifier is connected to the mains connection via a mains disconnection contactor. The precharge circuit is connected in parallel with the mains disconnection contactor. If the mains disconnection contactor is open, then the only current path leading to the rectifier or smoothing capacitor preferably passes via the precharge circuit. The precharge circuit is in particular switchable, for example by way of a transistor that is connected in series with a precharge resistor of the precharge circuit. When the transistor and the contactor are open, the mains connection is disconnected from the rectifier. The precharge circuit is thus switchable. The precharge circuit is furthermore a passive precharge circuit and is designed in particular without its own voltage source and without a converter.

The phase conductor is connected, in a connection section, to at least one further phase conductor of the AC charging device by way of a cross-connection line. The cross-connection line furthermore has a cross-connection switch for disconnecting the phase conductor and the further phase conductor. What is provided as an important concept of the invention is that the precharge circuit is arranged between a mains connection of a first phase conductor of the phase conductors and the connection section.

The invention is based on the finding that the AC charging device is able to be designed more simply if the precharge circuit is arranged between the mains connection of the first phase conductor and the connection section.

By arranging the precharge circuit between the mains connection of the first phase conductor and the connection section, it is possible to dispense with further precharge circuits in the further phase conductors, in particular a second phase conductor or a third phase conductor of the phase conductors, or in the cross-connection line or in the neutral conductor. By arranging the precharge circuit between the mains connection of the first phase conductor and the connection section, only a single precharge circuit is sufficient to be able to safely operate the AC charging device with three branches and for example only one phase conductor connected to the mains. By arranging the precharge circuit in the neutral conductor, it is thus possible for example to save on two precharge circuits.

There may be provision for a controller that is configured so as to first activate the precharge circuit, in particular by closing the transistor of the precharge circuit, and that is configured so as to close all of the cross-connection lines simultaneously or individually in succession or in groups in succession following the closure of the transistor. The smoothing capacitors are thereby also charged by phases that do not have their own precharge circuit. This is made possible by the switched current flow through the connection section.

The AC charging device is designed in particular as a three-phase current charging device. The AC charging device thereby in particular has three phase conductors. Each of the phase conductors may have the precharge circuit with a transistor. This means that the mains connection of each individual phase conductor is able to be switched to a voltage-free state if the respective mains connection is not connected to the mains.

The AC charging device is furthermore designed with at least one cross-connection line, such that at least two phase conductors are connected to one another via the cross-connection line. This is advantageous since a plurality of branches of the AC charging device may be used by the cross-connection line, even if the AC charging device is connected to the mains only via a single phase conductor.

The precharge circuit in particular has at least one precharge resistor. The precharge circuit may be arranged in parallel with a mains disconnection contactor. The precharge circuit may have a series-connected transistor that is configured in particular so as to completely disconnect the current path through the precharge circuit. The precharge resistor is connected in series with the transistor. The resultant series circuit of transistor and precharge resistor is connected in parallel with the mains disconnection contactor or bypasses it. If the mains disconnection contactor and the transistor are open, the phase in question is completely disconnected from the mains connection.

When a voltage is applied to the mains connection via the mains, the smoothing capacitor is therefore first of all precharged via the precharge circuit, that is to say via the precharge resistor, and in particular the closed transistor. The mains disconnection contactor of the phase conductor is open during the precharging. The mains disconnection contactor is preferably closed only when the smoothing capacitor has been sufficiently precharged via the precharge circuit.

There is furthermore preferably provision for the precharge circuit to have at least one in particular normally off or self-blocking transistor. As a result of the transistor, the mains connection of the AC charging device is able to be switched to a voltage-free state. The transistor is furthermore advantageous since otherwise, when a cross-connection switch of the cross-connection line is closed, there may be a mains short-circuit across a precharge resistor, so to speak. The motor vehicle is thereby able to be operated more safely.

The connection section is provided on a side of the precharge circuit that faces away from the mains connection. As a result, no current is able to flow via the connection section when the precharge circuit is open.

There is preferably provision for the precharge circuit to have a diode arranged upstream of the transistor, in particular with respect to the smoothing capacitor. The diode is designed to be blocking in the direction from the passive rectifier to the mains connection. The diode makes it possible to prevent current from flowing back via the precharge circuit, that is to say from the smoothing capacitor in the direction of the mains connection, as triggered by the mains curve. Even when the transistor is closed, no current is able to flow back through the diode from the smoothing capacitor in the direction of the mains connection via the precharge circuit. The AC charging device is thereby able to be operated more safely. The AC charging device may furthermore thereby be designed in a simple manner with the cross-connection lines. The diode and the transistor as well as the precharge resistor are connected in series. The diode is connected to the precharge resistor via the transistor. The diode is preferably connected to the mains connection and the resistor is connected to the rectifier, wherein there may also be provision for the opposite scenario. Instead of the diode, the transistor may also be connected to the mains connection, wherein the transistor is then connected to the resistor via the diode. Finally, the transistor may be connected to the mains connection and connected to the rectifier via the diode and the precharge resistor (in this order or the opposite order). The transistor is in particular a MOSFET. The transistor has an inverse diode. The reverse direction of the inverse diode is counter to the reverse direction of the diode. This enables full blocking by the transistor for each phase position or polarity of the voltage at the mains connection. As mentioned, the precharge circuit bypasses the disconnection contactor and enables complete disconnection or limitation of the charging current.

In addition, the cross-connection line preferably has a cross-connection switch for disconnecting the phase conductor and the further phase conductor.

The phase conductors may be connected to one another through the cross-connection line. The connection is provided in particular when only one of the phase conductors is connected to the mains, but a plurality of branches of the AC charging device are intended to be used for charging. Charging is thus able to be performed through the cross-connection line even with a current strength greater than 16 A, for example, since each individual branch of the AC charging device is designed only for a maximum of 16 A, for example. It may thus for example be the case that the correct charging connection is not available to connect the mains connection of the AC charging device to more than one phase conductor. The mains is then thus electrically connected only to a single mains connection, in particular of the first phase conductor. The current strength with which the on-board power system of the motor vehicle is supplied, in particular with which a battery of the motor vehicle is charged, may however be charged with preferably three times 16 A despite the mains connection to only one mains connection of the phase conductor or one pin of a plug connection of the AC charging device. That is to say, with a current strength that is three times higher than if only one branch were to be used instead of three branches for charging.

The cross-connection line in particular also has the cross-connection switch. The cross-connection line may be interrupted by the cross-connection switch.

There is in particular provision for the precharge circuit to be formed in parallel with the mains disconnection contactor. As a result of the arrangement of the precharge circuit in parallel with the mains disconnection contactor, the smoothing capacitor may be precharged with energy from the mains via the precharge circuit if the mains disconnection contactor and/or the mains disconnection circuit is open.

The invention also relates to a method in which an AC charging device for a motor vehicle is operated. The following steps are performed:

a) Opening a mains disconnection contactor of a first phase conductor of the AC charging device, which electrically connects a mains to an in particular passive rectifier of the AC charging device, if the mains disconnection contactor is not open;

b) Applying voltage from the mains to the AC charging device, wherein the phase conductor of the AC charging device, in a connection section, is electrically connected to at least one further phase conductor of the AC charging device by way of a cross-connection line;

c) Precharging at least one smoothing capacitor of the AC charging device by way of a precharging circuit arranged between a mains connection of the first phase conductor and the connection section; and d) Closing the mains disconnection contactor if the smoothing capacitor is precharged.

The AC charging device is in particular electrically connected to the mains only through the mains connection of the first phase conductor during the method or during operation. The mains connection of the second phase conductor and the mains connection of the third phase conductor are in particular not electrically connected to the mains.

There is preferably provision, in step c), for the smoothing capacitor in a first branch of the AC charging device to be precharged while a first cross-connection switch of the first cross-connection line is open, wherein the first cross-connection switch is closed following the in particular complete precharging of the smoothing capacitor in the first branch, and for at least one smoothing capacitor in a second branch of the AC charging device to be precharged. The smoothing capacitors are thereby able to be precharged sequentially. The smoothing capacitors of the first branch are thus preferably precharged first and then, after the precharging of the smoothing capacitors of the first branch has finished, the smoothing capacitors of the second branch are precharged. This is advantageous because the precharge resistor of the precharge circuit thereby only has to be designed for the current of a single branch. The precharge resistor and thus the AC charging device may thus be designed to be less expensive and more compact. The opening and closing may be provided by a controller that is connected so as to drive the relevant switches.

There is furthermore preferably provision, in step c), for the smoothing capacitor in the second branch of the AC charging device to be precharged while a second cross-connection switch of a second cross-connection line is open, wherein the first cross-connection switch is opened in particular following the in particular complete precharging of the smoothing capacitor in the second branch, and for the second cross-connection switch to be closed and at least one smoothing capacitor in a third branch of the AC charging device to be precharged. After the second branch, the smoothing capacitors of the third branch are thereby also able to be precharged separately from the smoothing capacitors of the first branch and of the second branch. This is again advantageous because the precharge resistor of the precharge circuit thereby only has to be designed for the current of a single branch. The precharge resistor and thus the AC charging device may thus be designed to be less expensive and more compact.

The invention also relates to a motor vehicle having an AC charging device according to the invention. The motor vehicle is preferably designed as a passenger car.

Advantageous embodiments of the AC charging device according to the invention or of the vehicle should be regarded as advantageous embodiments of the method according to the invention. The relevant components of the AC charging device or of the motor vehicle are each designed to perform the respective method steps.

Further features of the invention emerge from the claims, the figures and the description of the figures.

Exemplary embodiments of the invention will be explained in more detail below on the basis of schematic drawings.

DETAILED DESCRIPTION OF THE INVENTION

In the figures, identical or functionally identical elements are provided with identical reference signs.

Figure 1:
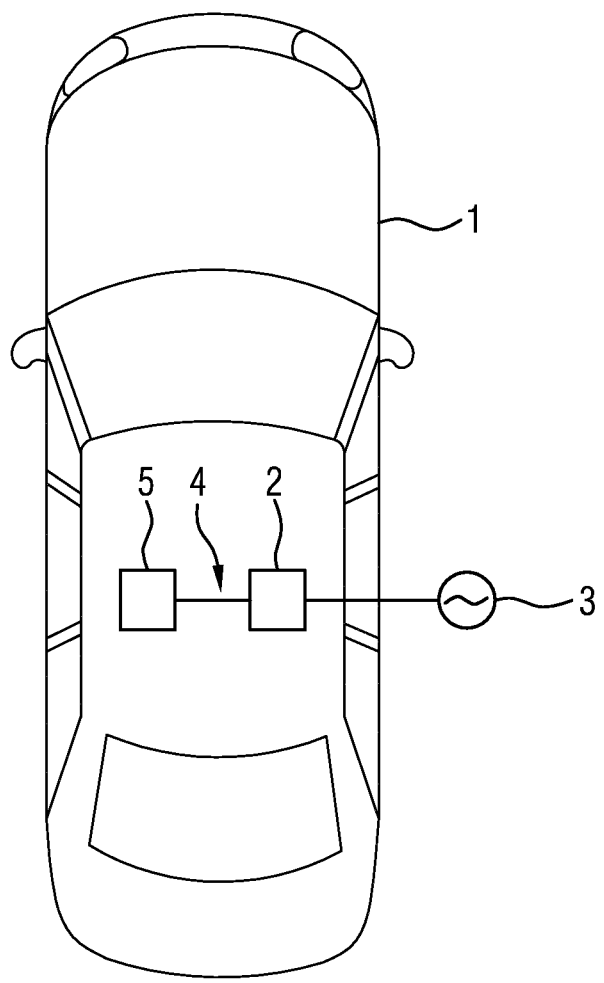
FIG. 1 shows a schematic top-down illustration of a motor vehicle with one exemplary embodiment of an AC charging device according to the invention.

FIG. 1 shows a schematic top-down illustration of a motor vehicle 1 with an AC charging device 2. According to the exemplary embodiment, the AC charging device 2 is in the charging state and is connected to a mains 3. The mains 3 provides AC current. The AC charging device is furthermore electrically connected to a traction battery 5 of the motor vehicle 1 via an on-board power system 4 of the motor vehicle 1. According to the exemplary embodiment, the on-board power system 4 is designed as a high-voltage on-board power system of for example 400 V.

Figure 2:
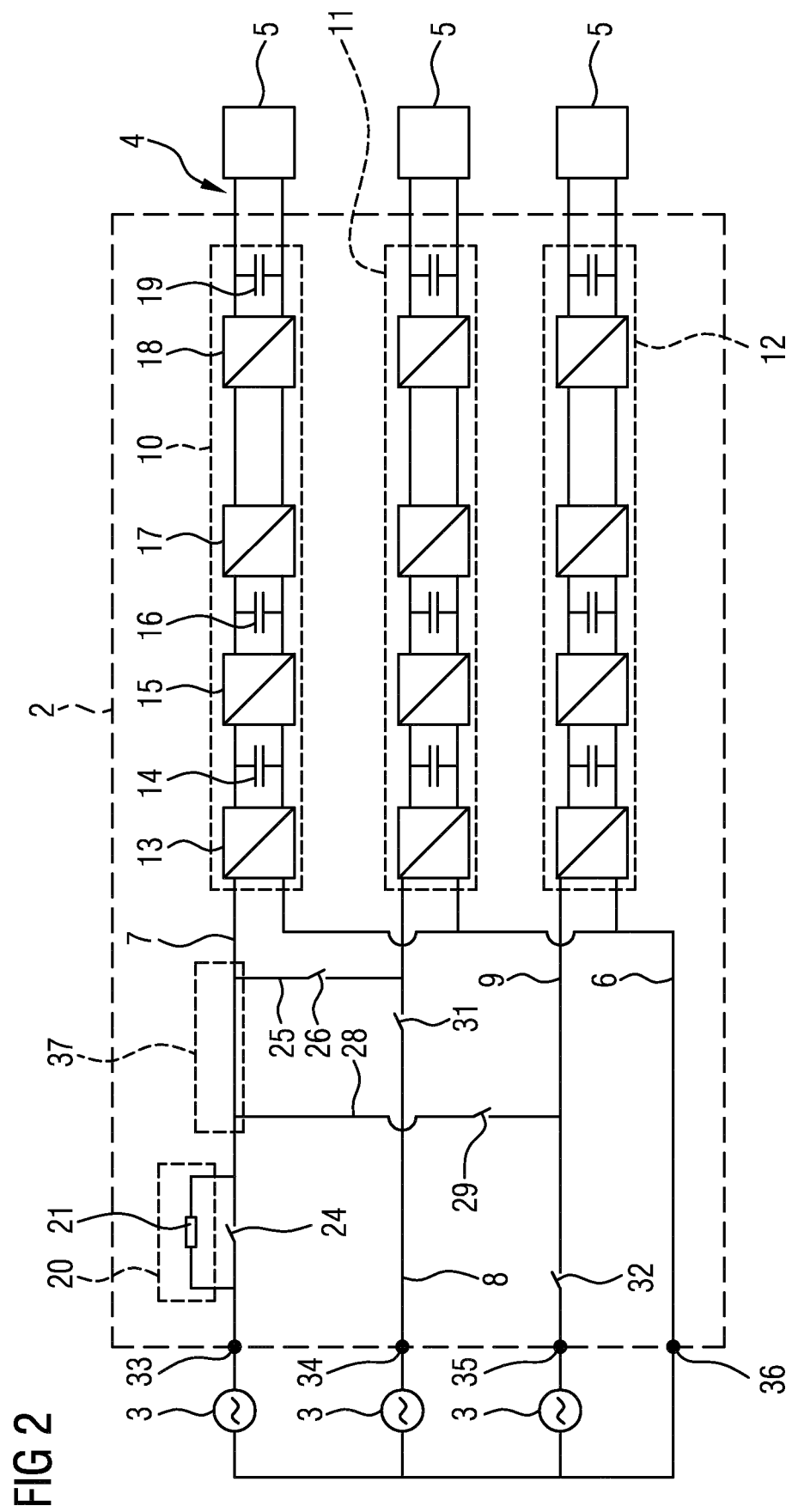
FIG. 2 shows a schematic illustration of one exemplary embodiment of the AC charging device with a precharge circuit with a precharge resistor and two cross-connection lines, each with a cross-connection switch.

FIG. 2 shows the AC charging device 2. The AC charging device 2 has a neutral conductor 6, a first phase conductor 7, a second phase conductor 8 and a third phase conductor 9. The neutral conductor 6 and the first phase conductor 7 are electrically connected to the mains 3. According to the exemplary embodiment, the second phase conductor 8 and the third phase conductor 9 are on the other hand connected to the mains 3 not directly, but rather in particular only via the first phase conductor 7.

The first phase conductor 7 is electrically connected to a first branch 10 of the AC charging device 2. The second phase conductor 8 is directly electrically connected to a second branch 11 of the AC charging device 2. The third phase conductor 9 is directly electrically connected to a third branch 12 of the AC charging device 2. According to the exemplary embodiment, the first branch 10 is designed identically to the second branch 11 or to the third branch 12. The first branch 10 is described below as an example for the other two branches 11, 12.

The first branch 10 of the AC charging device has a first passive rectifier 13, a first smoothing capacitor 14, a DC-to-DC voltage converter 15, a second smoothing capacitor 16, an inverter 17, a second rectifier 18 and a third smoothing capacitor 19. A transformer may be arranged between the inverter 17 and the second rectifier 18. The transformer may lead to galvanic isolation between the mains 3 and the on-board power system 4. However, the AC charging device is preferably designed without the transformer, as a result of which the mains 3 and the on-board power system 4 are galvanically connected.

According to the exemplary embodiment, a precharge circuit 20 is arranged in the first phase conductor 7. According to the exemplary embodiment, the precharge circuit 20 comprises a precharge resistor 21. This is connected in series in the precharge circuit 20 in order thus to limit the current.

Figure 3:
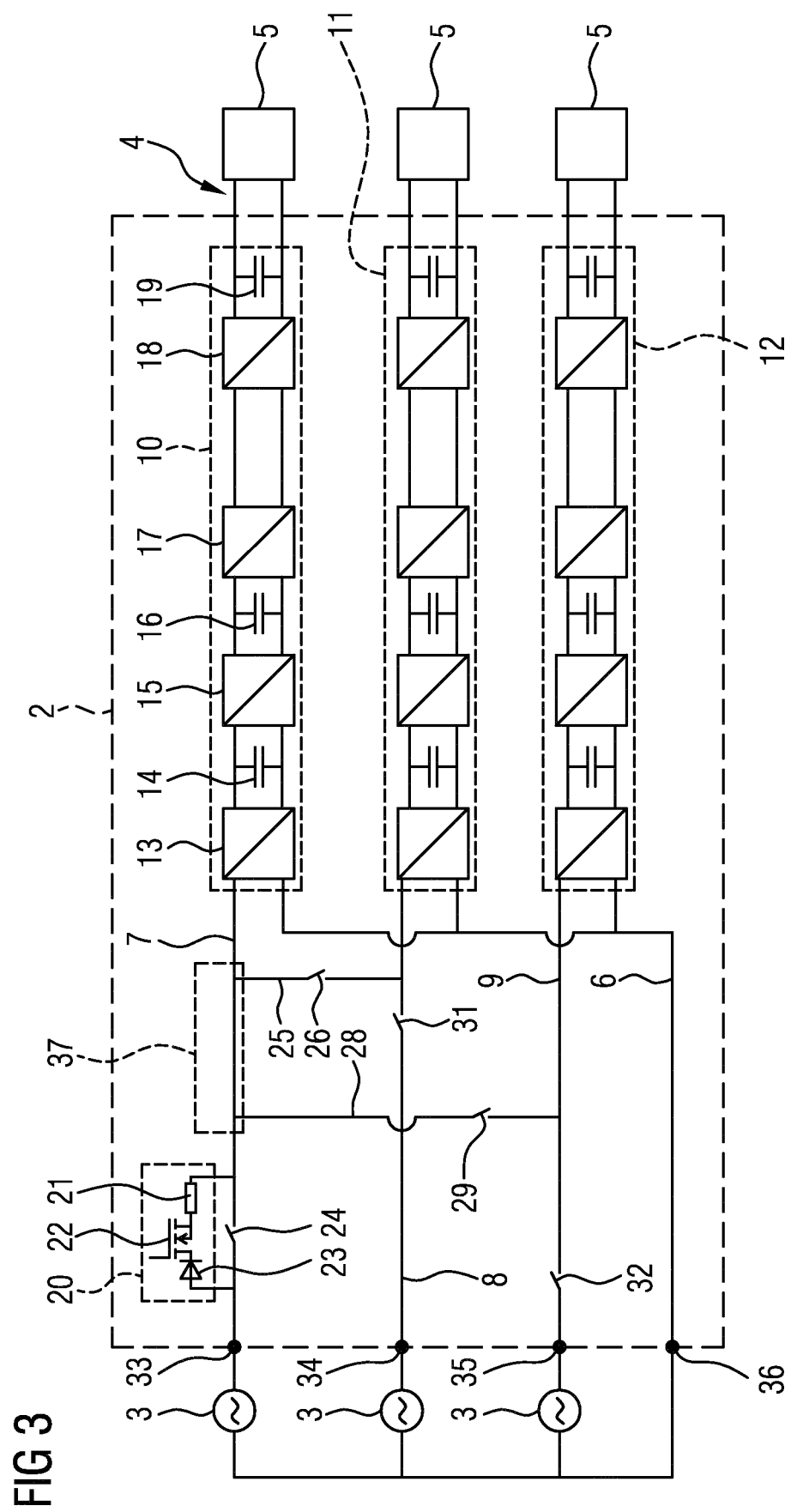
FIG. 3 shows a schematic illustration of a further exemplary embodiment of the AC charging device with the precharge circuit with a transistor.

According to the exemplary embodiment of FIG. 3, the precharge circuit also comprises a normally off transistor 22 and a diode 23. The forward direction of the diode 23 runs from the mains 3 to the first smoothing capacitor 14. The transistor and the diode are connected to one another in antiseries. This results in a series circuit of diode 23, transistor 22 and precharge resistor 21, the ends of this series circuit being connected in parallel with the contactor 24. The series circuit or the precharge circuit bridges the contactor 24 in a controllable manner.

The first smoothing capacitor 14 and/or the second smoothing capacitor 16 and/or the third smoothing capacitor 19 are/is precharged via the precharge circuit 20. If the smoothing capacitors 14, 16, 19 are precharged, that is to say brought to the voltage of the mains 3 as a result, a first mains disconnection contactor 24 of the first phase conductor 7, connected in parallel with the first precharge circuit 20, is closed. After the first mains disconnection contactor 24 has been closed, the current flows substantially via the first mains disconnection contactor 24 and no longer via the precharge circuit 20. The first mains disconnection contactor 24 is designed for 16 A according to the exemplary embodiment. The first mains disconnection contactor 24 may however also be designed for a wide variety of other currents.

The first phase conductor 7 is furthermore electrically connected to the second phase conductor 8 via a first cross-connection line 25. The first cross-connection line 25 has a second mains disconnection contactor 26.

According to the exemplary embodiment, the first cross-connection switch 26 is designed identically to the first mains disconnection contactor 24.

The first phase conductor 7 is furthermore electrically connected to the third phase conductor 9 by a second cross-connection line 28. The second cross-connection line 28 has a second cross-connection switch 29.

The cross-connection switches 26, 29 are preferably designed to be structurally identical.

The second phase conductor 8 has a second mains disconnection contactor 31. The third phase conductor 9 has a third mains disconnection contactor 32. The mains disconnection contactors 24, 31, 32 are preferably designed identically. An electrical connection between a mains connection 32 of the first phase conductor 7 and the first branch 10 may be interrupted by the first mains disconnection contactor 24. An electrical connection between a mains connection 34 of the second phase conductor 8 and the second branch 11 may be interrupted by the second mains disconnection contactor 31. An electrical connection between a mains connection 35 of the third phase conductor 9 and the third branch 12 may be interrupted by the third mains disconnection contactor 32. The mains connections 33, 34, 35 may be designed for example as pins of a plug. The plug may be designed for example as a three-phase plug that has three pins as the mains connections 33, 34, 35 of the phase conductors 7, 8, 9 and a further pin as a mains connection 36 of the neutral conductor 6.

According to the exemplary embodiment, only the mains connection 33 of the first phase conductor 7 and the mains connection 36 of the neutral conductor 6 are connected directly to the mains 3. According to the exemplary embodiment, the mains connection 34 of the second phase conductor 8 and the mains connection 35 of the third phase conductor 9 are not electrically connected to the mains 3, but are suitable for being connected thereto if the appropriate connection is provided on the mains side.

The first cross-connection line 25 makes it possible for the second branch 11 to be supplied with power if only the mains connection 33 of the first phase conductor 7 is connected to the mains 3 while the mains connection 34 of the second phase conductor 8 is not connected to the mains 3. Similarly, the third branch 12 may be supplied with power via the second cross-connection line 28 if only the mains connection 33 of the first phase conductor 7 is electrically connected to the mains 3 and the mains connection 34 of the second phase conductor 8 and the mains connection 35 of the third phase conductor 9 are not connected to the mains 3.

LIST OF REFERENCE SIGNS

1 Motor vehicle
2 AC charging device
3 Mains
4 On-board power system
5 Traction battery
6 Neutral conductor
7 First phase conductor
8 Second phase conductor
9 Third phase conductor
10 First branch
11 Second branch
12 Third branch
13 First rectifier
14 First smoothing capacitor
15 DC-to-DC voltage converter
16 Second smoothing capacitor
17 Inverter
18 Second rectifier
19 Third smoothing capacitor
20 Precharge circuit
21 Precharge resistor
22 Transistor
23 Diode
24 First mains disconnection contactor
25 First cross-connection line
26 First cross-connection switch
28 Second cross-connection line
29 Second cross-connection switch
31 Second mains disconnection contactor
32 Third mains disconnection contactor
33 Mains connection of the first phase conductor
34 Mains connection of the second phase conductor
35 Mains connection of the third phase conductor
36 Mains connection of the neutral conductor
37 Connection Section.

The invention claimed is:

1. An AC charging device for a motor vehicle, the AC charging device comprising:
   a neutral conductor and a plurality of phase conductors;
   at least one rectifier connected with said neutral conductor and one of said phase conductors;
   at least one smoothing capacitor connected to said at least one rectifier;
   a precharge circuit connected between a mains connection of the AC charging device and said at least one smoothing capacitor, said precharge circuit being configured to precharge said smoothing capacitor;
   a cross-connection line, in a connection section, electrically connecting a first phase conductor of said plurality of phase conductors to at least one further phase conductor of said plurality of phase conductors;
   said cross-connection line having a cross-connection switch for disconnecting said first phase conductor and said at least one further phase conductor; and
   said precharge circuit being arranged between the mains connection of said first phase conductor and said connection section.

2. The AC charging device according to claim 1, wherein said precharge circuit between the mains connection of said first phase conductor and said connection section is a single overall precharge circuit of the AC charging device.

3. The AC charging device according to claim 1, wherein said precharge circuit has at least one transistor and a precharge resistor that are connected to one another in series.

4. The AC charging device according to claim 3, wherein said transistor is a normally-off transistor.

5. The AC charging device according to claim 1, wherein said precharge circuit has a diode and a precharge resistor that are connected to one another in series.

6. The AC charging device according to claim 5, wherein said diode is arranged upstream of said transistor with respect to said smoothing capacitor.

7. A motor vehicle, comprising an AC charging device according to claim 1.

8. A method for operating an AC charging device for a motor vehicle, the method comprising:
   a) opening a mains disconnection contactor of a first phase conductor of the AC charging device which electrically connects a mains to a rectifier of the AC charging device, if the mains disconnection contactor is not open;

b) applying a voltage from the mains to the AC charging device, wherein the first phase conductor of the AC charging device is electrically connected to at least one further phase conductor of the AC charging device in a connection section by way of a cross-connection line;

c) precharging at least one smoothing capacitor of the AC charging device (2) by way of a precharging circuit arranged between a mains connection of the first phase conductor and the connection section; and d) closing the mains disconnection contactor when the smoothing capacitor is precharged.

9. The method according to claim 8, wherein step c) comprises:

precharging the smoothing capacitor in a first branch of the AC charging device while a first cross-connection switch of the first cross-connection line is open;

following the precharging of the smoothing capacitor in the first branch, closing the first cross-connection switch, and precharging at least one smoothing capacitor in a second branch of the AC charging device.

10. The method according to claim 9, wherein step c) further comprises:

precharging the smoothing capacitor in the second branch of the AC charging device while a second cross-connection switch of a second cross-connection line is open; and closing the second cross-connection switch and precharging at least one smoothing capacitor in a third branch of the AC charging device.

* * * * *